N. MAXFIELD.
LAMP ADJUSTING MECHANISM.
APPLICATION FILED MAR. 13, 1913.
1,074,186.
Patented Sept. 30, 1913.
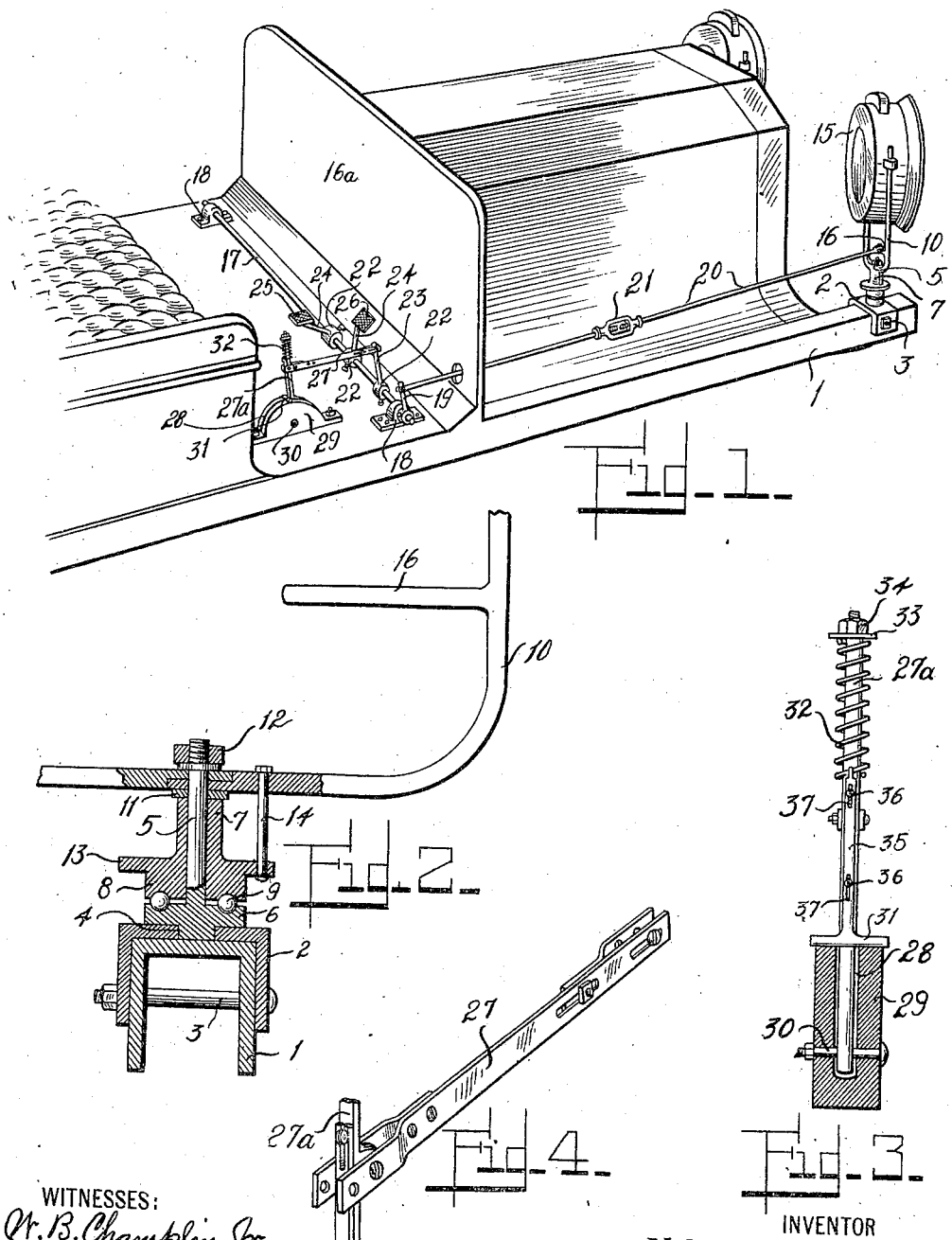
WITNESSES:
W. B. Champlin, Jr.
INVENTOR
Nelson Maxfield.
BY John M. Spellman
ATTORNEYS

UNITED STATES PATENT OFFICE.

NELSON MAXFIELD, OF MALONE, TEXAS.

LAMP-ADJUSTING MECHANISM.

1,074,186.  Specification of Letters Patent.  Patented Sept. 30, 1913.

Application filed March 13, 1913. Serial No. 753,943.

*To all whom it may concern:*

Be it known that I, NELSON MAXFIELD, a citizen of the United States, residing at Malone, in the county of Hill and State of Texas, have invented certain new and useful Improvements in Lamp-Adjusting Mechanism, of which the following is a specification.

My invention relates to a new and useful mechanism for pivotally adjusting one of the lamps of an automobile, said mechanism being adapted for operation from the driver's seat. Thus the driver of the automobile is enabled from his seat to partially rotate one of the forward lamps about a vertical axis causing the light therefrom to follow the curve of a road or to illuminate any object at one side of the automobile, as for example a house number.

I have illustrated an exemplification of my invention in the accompanying drawing, wherein:

Figure 1 is a perspective view of the forward portion of an automobile showing my invention applied thereto. Fig. 2 is a vertical sectional view of the lamp supporting structure. Fig. 3 is a transverse vertical sectional view of a brake structure for holding the lamp and adjusting mechanism against accidental displacement. Fig. 4 is a detail of the connecting rod.

Referring now more particularly to the drawing, wherein like reference characters designate similar parts in all the figures, the numeral 1 denotes the chassis rail of any automobile, on which, in the present instance, one of the forward lamps is mounted. A U-shaped bracket member 2 is held fast on the rail 1 by the bolt and nut 3 or in any desired manner. The bracket member 2 is provided with a centrally disposed aperture 4, in which is rigidly mounted a vertical pivot post 5, having an integral circular base 6, contiguous with the bracket 2. A sleeve 7, having an integral circular base 8 is rotatably mounted on the post 5, and the opposing faces of the members 6 and 8 are provided with corresponding ball races carrying a suitable number of balls 9, forming a bearing for the sleeve 7. A U-shaped lamp bracket 10 is mounted upon the post 5 above the sleeve 7, said bracket being preferably formed of two parts for convenience in assembling. The meeting ends of the two bracket parts are respectively provided with apertures to receive the post 5, and are correspondingly counter sunk to form a smooth joint, as clearly shown in Fig. 2. I preferably provide a washer 11 between the bracket 10 and the sleeve 7 and the upper end portion of the post is formed with a shoulder, against which bears a nut 12 preventing upward displacement of the parts carried by the post. The upper extremity of the member 8 is provided with a flange 13 of a somewhat greater diameter than said member, and a rigid relation is established between the bracket 10, and the parts 7, 8 and 13 by a vertical bolt 14, having its extremities respectively mounted in the bracket 10 and flange 13. The lamp 15 is mounted between the arms of the bracket 10, being secured to said arms in any convenient manner. Beneath the lamp, a finger 16 projects from one bracket arm toward the other, the function of said finger being hereinafter made clear.

Upon the floor of the automobile, adjacent to the dash board 16ª, a rod 17 is mounted transversely of the car at a slight elevation above said floor, the ends of said rod being mounted fast in brackets 18 disposed respectively adjacent to the sides of the car. Upon that extremity of the bar 17, which lies to the rear of the lamp 15, an upright arm 19 is rigidly mounted, said arm having pivotal connection with the rear end of a rod 20, which pivotally connects at its forward end with the finger 16. A turnbuckle 21 included in the rod 17, serves to make the same extensible in length. Upon the rod 20 there are mounted fast three set collars 22, from one of which an arm 23 projects rigidly upward, parallel to the arm 19, and from the other two there project arms 24, extending respectively forward and rearwardly from the plane of the arms 19 and 23. The two arms 24 are surmounted by foot pedals respectively designated by the numerals 25 and 26. A rod 27 establishes a swinging connection between the free end of the arm 23 and the center of a rocker-arm 27ª. The lower extremity of the arm 27ª projects into a slot 28 provided in the curved face of an arcuate bracket 29 and is pivoted upon a bolt 30 passing transversely through the bottom portion of said slot, said arm being adapted to swing back and forth in said slot. A brake shoe 31 is normally held in firm contact with the curved face of the bracket 29 by a coiled spring 32, coiled upon the upper portion of the rocker arm, bearing at its upper end against a washer 33, seated upon a shouldered portion of the rocker arm, and held against upward displacement by a lock nut 34. The lower end of the spring bears against the upper end of a bar 35 carrying said brake shoe at its lower end. The bar 35 is held contiguous with the rocker-arm by screws 36, fixed in said rocker arm and projecting through slots 37 in said bar, this form of connection leaving said bar 35 free to bear downwardly under the pressure of the coiled spring.

Under normal conditions, the arms 19 and 23 and the rocker arm 27ª are vertically disposed, and the lamp 15 is so adjusted as to throw its light straight ahead. When the driver wishes to adjust the lamp to change the direction of its light, he will press either the foot pedal 25 or 26, according as he wishes to throw the light toward the right or left side of the car. The brake shoe 31 bearing upon the arcuate face of the bracket 29 serves to prevent the lamp and the mechanism for pivotally adjusting the same from undergoing accidental displacement from any position of adjustment. The bar 17 is extended the entire width of the car in order that the foot pedal carrying arms 24 may be adjusted to be readily reached by a person occupying either side of the driver's seat. The correlated parts 22, 23, 27, 29, etc., may also be adjusted to any desired position along the rod 17.

For automobile use I prefer to equip one lamp only with my turning mechanism. Thus in turning a curve on a country road one lamp will remain straight ahead and the other lamp is turned to follow the curve of the road as the car turns, or, on a straight road, to pick out any object at the side of the road. Also, for city use, in passing along a straight street, one lamp remains straight ahead to accord with the city regulations and the rotatable lamp may be turned at will by the driver to pick out street numbers, house numbers, etc.

What I claim is:

In a device of the character described, the combination with an automobile lamp pivoted to rotate about a vertical axis, of a rock shaft mounted upon the floor of the automobile transverse thereof, an arm fast upon one extremity of said rock shaft, an extensible rod extending from said arm to the lamp adapted to communicate a partial rotation to the lamp when the rock shaft is actuated, a pair of foot pedals rigidly carried by the rock shaft and adapted to actuate the same oppositely, and a friction brake mechanism for holding the rock shaft against accidental displacement in any position of adjustment.

In testimony whereof I have signed my name to this specification in the presence of two subscribing witnesses.

NELSON MAXFIELD.

Witnesses:
J. S. MURRAY,
CLELLIE CARR.